(12) United States Patent
Patton et al.

(10) Patent No.: US 7,303,775 B1
(45) Date of Patent: Dec. 4, 2007

(54) CARBOHYDRATE RUMINANT FEED ENERGY SUPPLEMENT AND METHOD

(75) Inventors: Richard S. Patton, Galisteo, NM (US); Arnold R. Hippen, Flandreau, SD (US)

(73) Assignee: Penn State Research Foundation, University Park, PA (US)

( * ) Notice: Subject to any disclaimer, the term of this patent is extended or adjusted under 35 U.S.C. 154(b) by 399 days.

(21) Appl. No.: 10/365,146

(22) Filed: Jun. 3, 2003

(51) Int. Cl.
*A23K 1/18* (2006.01)

(52) U.S. Cl. .............................. 426/2; 426/72; 426/74; 426/630; 426/635; 426/807; 424/442

(58) Field of Classification Search .................... 426/2, 426/72, 74, 623, 630, 635, 807; 424/442
See application file for complete search history.

(56) References Cited

U.S. PATENT DOCUMENTS

| | | | | |
|---|---|---|---|---|
| 2,876,157 A | * | 3/1959 | Seiden | 514/23 |
| 3,925,560 A | | 12/1975 | Scott et al. | 426/2 |
| 3,959,493 A | * | 5/1976 | Baalsrud et al. | 426/2 |
| 5,182,126 A | | 1/1993 | Vinci et al. | 426/74 |
| 5,219,596 A | * | 6/1993 | Smith et al. | 462/2 |
| 5,660,852 A | * | 8/1997 | McKeown et al. | 424/438 |
| 5,789,001 A | | 8/1998 | Klopfenstein et al. | 426/2 |
| 5,874,102 A | | 2/1999 | Lajoie et al. | 424/438 |
| 6,033,689 A | * | 3/2000 | Waterman et al. | 426/2 |
| 6,126,986 A | | 10/2000 | Harris et al. | 426/658 |
| 6,322,827 B1 | * | 11/2001 | Scott et al. | 426/2 |
| 6,440,447 B1 | | 8/2002 | Luhman et al. | 424/438 |
| 6,818,235 B2 | * | 11/2004 | Block et al. | 426/2 |
| 2003/0211200 A1 | * | 11/2003 | Hoover | 426/2 |

OTHER PUBLICATIONS

Kurz, M.M & Willett, L.B., "The Clearance of Carbon-14-Fructose, Carbon-14-Glucose, and Carbon-14-Sorbitol by Calves at Birth and 7 Days of Age", Journal of Dairy Science, 1991, pp. 236-246, vol. 75, Dept. fo Dairy Science, Ohio State University, Wooster, Ohio.
Ostos, M., Recalde, D., Baroukh, N., Callejo, A., Rouis, M., Castro, G., Zakin, M., Fructose Intake Increases Hyperlipidemia and Modifies Apolipoprotein Expression in Apolipoprotein AI-CIII-AIV Transgenic Mice, Feb. 11, 2002, pp. 918-923, Symposium, Paris & Lille, France and Leon, Spain.

* cited by examiner

*Primary Examiner*—C. Sayala
(74) *Attorney, Agent, or Firm*—Jeffrey A. Proehl; Woods, Fuller, Shultz & Smith, P.C.

(57) ABSTRACT

A carbohydrate ruminant feed energy supplement and method for alleviating a negative energy balance in ruminant animals. includes forming a ruminally protected carbohydrate, preferably non insulin stimulating, and feeding the ruminally protected carbohydrate to a ruminant animal.

24 Claims, 6 Drawing Sheets

CARBOHYDRATE RUMINANT FEED ENERGY SUPPLEMENT AND METHOD

BACKGROUND OF THE INVENTION

1. Field of the Invention

The present invention relates to feed supplements and more particularly pertains to a new postpartum ketosis preventative feed supplement and method for alleviating a negative energy balance in ruminant animals.

2. Background History

During periods of negative energy balance, the postparturient dairy cow, periparturient ewes, and other ruminant animals suffer from carbohydrate insufficiency which is due to excessive fat mobilization from body stores and the development of fatty liver and ketosis.

The modern dairy cow is a product of genetic selection that produces milk beyond our ability to feed her. Virtually every cow loses body weight after calving, the result of body reserves mobilized to meet the energy needs of lactation. The reduction in body fat has an adverse effect on milk production. Although introduction of fat into the feed of ruminant animals lessens the conversion of existing body fat to fight the energy deficit, the proportion of fat in feed is limited due to adverse effects on the microorganisms of the rumen. An unavoidable reality contributing to this energy deficit is that anything eaten by an herbivore is first passed to the rumen where bacteria ferment nearly every gram of high energy carbohydrate. Consequently, it is universally recognized that no appreciable soluble sugars are presented postruminally to the abomasum or small intestine after exposure to the bacterial fermentation in the rumen. Therefore, direct comparison to monogastric carbohydrate metabolism does not provide immediate answers.

3. Description of the Prior Art

Current methods of preventing this condition and improving the carbohydrate status of these ruminant animals focus on increasing dietary carbohydrate in the form of starches and glucose precursors. The theory behind these methodologies is that the increase in dietary glucose precursors will increase blood glucose and insulin concentrations thereby suppressing mobilization of body fat and the formation of ketone bodies by the liver. Various examples may be found in U.S. Pat. Nos. 5,182,126; 6,126,986; 5,789,001; 5,219,596; 3,925,560; 5,874,102; 5,660,852; and 6,440,447.

Evidence exists, however, that bovine adipose tissue is not very responsive to insulin during the early postparturient period. Increases in blood insulin only minimally suppress fatty acid mobilization and serve to further decrease blood glucose concentrations by increasing glucose uptake by peripheral tissues. Further and most importantly, insulin concentrations are decreased in blood of animals suffering ketosis, limiting the uptake of glucose by tissues. Therefore, delivery of a carbohydrate source that is not dependent upon insulin for uptake by tissues will improve carbohydrate status during this period of hypoinsulinemia. The ideal compound would not be directly stimulatory to insulin. Such a carbohydrate could then be supplied to the tissue without further decreasing glucose concentrations in blood as is the case with insulin stimulating substrate, thus, alleviating carbohydrate insufficiency suffered by these ruminant animals.

U.S. Pat. No. 5,182,126 issued to Vinci et al. discusses the importance of blood glucose and the relative ineffectiveness of introducing glucose directly into feed. Vinci et al. as discussed generally above, focuses on gluconeogenesis by specifically teaching the use of glucogenous substances such as propionate in ruminally inert material to carry the glucose precursor past the rumen intact.

Studies have also been performed in monogastric carbohydrate metabolism to determine the effects of carbohydrates and proteins on blood glucose, glucagon, and insulin levels. Studies demonstrated that high carbohydrate diets typically increased insulin levels in greater proportion than glucagon while high protein diets promoted glucagon production and suppressed insulin production.

The need remains for a feed for ruminants and method that is readily absorbed by the animal, reduces stress on the liver, has little or no adverse effect on glucagon production, and does not stimulate insulin production. Thus, objectives of the present invention are to provide a feedstuff and method that provides sparing of glucose utilization, the prevention of ketosis, higher milk production, and quicker weight gain postpartum.

SUMMARY OF THE INVENTION

The present invention is a feedstuff designed to prevent or alleviate the metabolic effects of the negative energy balance associated with parturition and periods of decreased feed intake in ruminant animals. The proposed feedstuff provides carbohydrate-based energy substrate to tissues of the animal even in the presence of low blood insulin concentrations which are characteristic of a negative energy balance. One example of such a feedstuff consists of fructose enrobed in a matrix to provide protection of the fructose from ruminal degradation and to deliver the compound for postruminal absorption. This feed is designed to deliver fructose, or similar carbohydrate, orally at amounts of 5 gm to 10 kg/d to each animal.

The foregoing broadly outlines the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
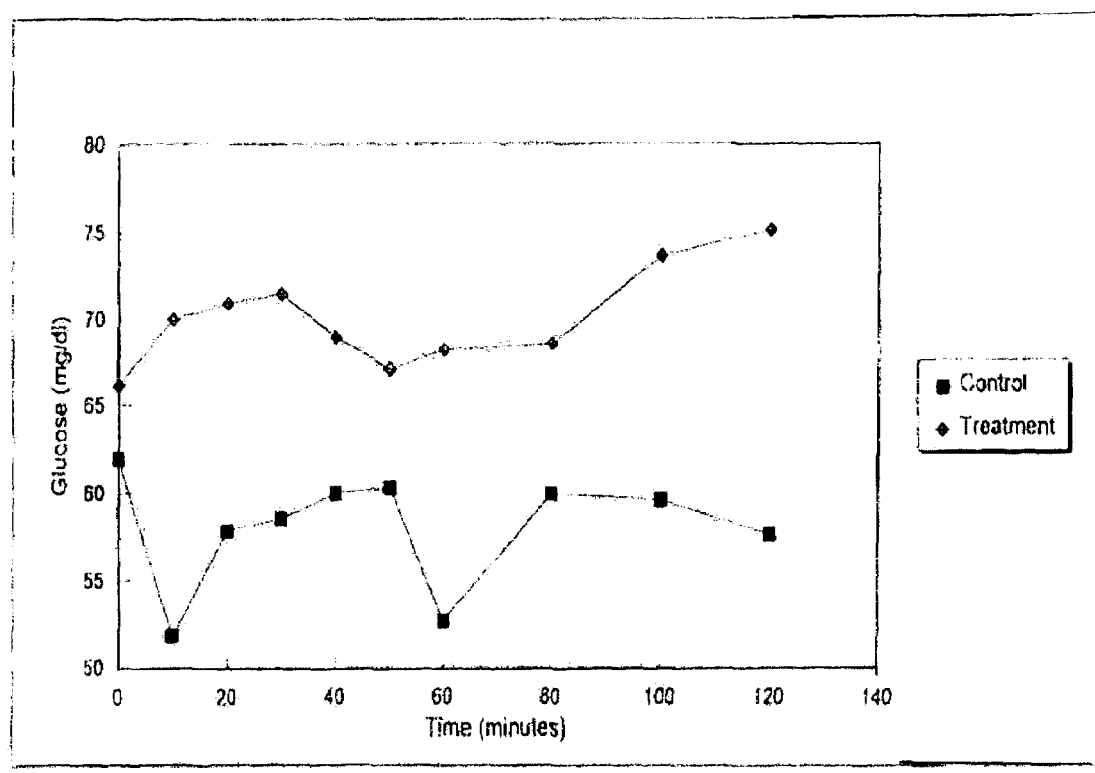
FIG. 1 is a graph showing blood glucose concentrations in cow after feeding ruminally protected fructose (● Treatment) or a control diet (▲ control) for 2 weeks. Samples were collected for a 2 hour interval after feeding.

The present invention generally comprises an energy enhancing feed ingredient that is rumen inert and fed to a ruminant at any point in its post weaning life cycle. This product has as its unique feature the inclusion of fructose or any ingredient that contains fructose. It may be:

a) mixed in a complete feed, b) mixed in a grain portion of a complete feed, c) mixed in a mineral or vitamin supplement component of an animals feed, d) mixed in a protein supplement of an animals feed, e) topped dressed on a complete ration of grain portion; or f) added to a liquid supplement portion of an animals feed Fructose is a monsaccharide that meets the above objectives. Rapid fermentation of sugars by rumen microbes, however, has not allowed postruminal delivery of fructose for uptake by intestinal tissues and absorption into circulation. Recent technologies, however, have enabled the encapsulation of fructose, and other simple sugars, to prevent degradation by ruminal microorganisms yet still allow digestion of the fructose in the lower digestive tract. This document describes the use of fructose, combined with encapsulation technologies to alleviate the carbohydrate insufficiency associated with a negative energy balance and the development of fatty liver in ruminant animals.

Fructose, a simple sugar typically fermented in the rumen, offers the possibility of relief when it can be absorbed postruminally. Fructose increases hepatic lipogenesis. Studies have shown that fructose is converted to fat by rat liver at a much higher rate than glucose, due to the fact that basic liver metabolism favors a lipogenic pathway for fructose. This feature alone helps meet tissue energy demands and prevent or lessen the mobilization of depot fat in postpartum ruminants.

Further, fructose has the feature of interacting differently with insulin for entry into the cell. As indicated by at least one authority, fructose is a less potent insulin secretagogue than sucrose or glucose.

Additional evidence illustrates the potential of fructose: Its transport in the mammalian intestine is mediated by a relatively specific carrier mechanism with properties distinct from those of the carrier utilized by other monosaccharides. Fructose, by way of its metabolite fructose-2,6-biphosphate, is an important factor in the regulation of carbohydrate metabolism in mammalian tissues.

Human trials have shown that oral sucrose and glucose both caused glucagon to decline, but the same dose of fructose did not. Thus, fructose does not interfere with hepatic gluconeogenesis under the influence of glucagon. Further tests have shown that blood glucose levels declined more in exercised humans when fed glucose than when fed fructose.

As previously stated, these tests in monogastric mammals could not be directly applied to ruminant animals due to breakdown of fructose that would take place within the rumen. However, the present invention demonstrates that the benefits of fructose accrue for the energy deficient ruminant when the fructose is protected from fermentation in the rumen and absorbed post-ruminally. Thus, the present invention aids in elevating a ruminant's energy status in a new and innovative fashion, not heretofore known or suggested by prior art attempts to address postpartum energy deficiency in ruminants.

Tests of the present invention yielded positive results in which cows fed rumen inert fructose had higher blood glucose than controls and also showed consistently higher dry matter intake. Strong dry matter intake is universally acknowledged as indicative of robust health in agriculture animals. In a second feeding trial, milking cows fed rumen inert fructose displayed an elevated average blood glucose level. The glucose levels of one cow in the testing is provided below.

There are several known methods of achieving rumen bypass. One is outlined in U.S. Pat. No. 5,874,102 issued to LaJoie and Cummings. Balchem Corporation manufactures and sells a rumen inert form of choline. Another method is to enrobe the material to be bypassed in a vegetable fat saturated (hydrogenated) to a specific melting point at rumen pH and controlled for particle size and density that allows a specific gravity that promotes bypass (the exit from the rumen being at the bottom). This approach does not use salts of long chain fatty acids for bypass, per LaJoie and Cummings. Enrobing can be achieved by mixing the fructose and rumen inert carrier together and drying in a drum dryer, drying oven or using a spray dryer to make prills. The formulation of the invention is from 0.5 to 95% fructose (or sucrose, or any blend of fructose and sucrose), the exact amount of carbohydrate determined by the method of bypass, with the balance to 100% comprised of the rumen bypass component.

The use of the product is as a feed for ruminants (all bovines, sheep, goats) to be fed at the rate of 5 grams to 10 kilos/animal/day, with the practical amount, due to contemporary economics, about 1 kilo per 500 kg body weight.

EXPERIMENT 1

Experimental design. Four mid-lactation Holstein cows were used in a 6 week trial. The cows were adapted to Calan Broadbent door feeders 2 weeks prior to the start of the trial. Diets were a total mixed ration consisting of corn silage, alfalfa, soybean meal (SBM), and hay. The experimental design was a double switch back. All cows received basal diet for 1 week, followed by either the basal diet plus corn starch or basal diet plus rumen protected fructose for 2 week periods. Fructose was introduced into the diet gradually, starting at 150 g/day and increasing daily by 150 g until 1 kg/day was fed throughout week 2 of each experimental period. The ruminally protected fructose product (RPF) contained 80% fructose by weight. There were three experimental periods. Two cows received rumen protected fructose during periods 1 and 3; the other two cows received rumen protected fructose during period 2.

Feed intakes and refusals were measured daily. At the end of each two-week period, blood and milk samples were taken. The blood samples were collected by tail venipuncture at intervals of 2 hours for 6 hours starting 2 hours after morning feeding. Milk samples were collected at a.m. and p.m. milkings for determination of protein, fat, lactose, milk solids and somatic cell counts.

Figure 2:
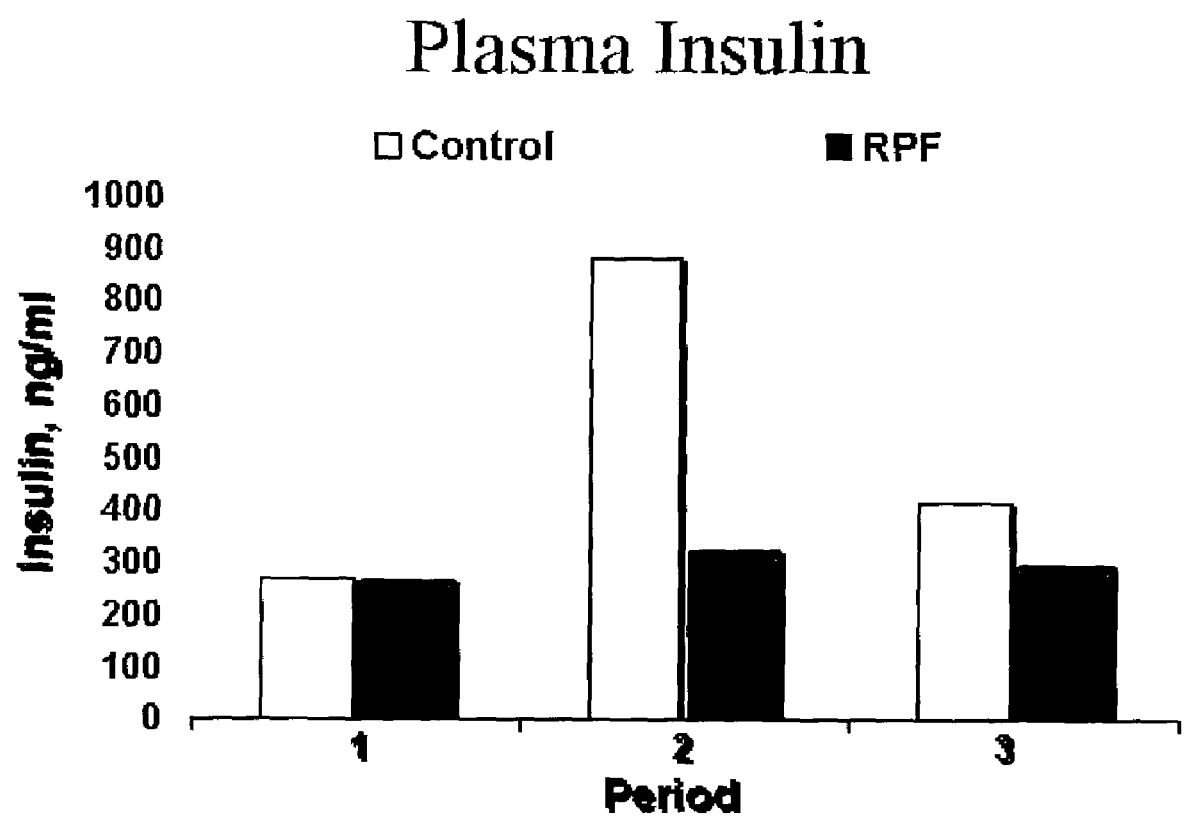
FIG. 2 is a graph showing concentrations of insulin in plasma of midlactation Holstein Cows fed ruminally protected fructose (RPF) or corn starch (control) at 1 kg/d for three 2-wk periods.

Results. Dry matter intake and milk production and composition were not affected by feeding fructose. Concentrations of glucose in blood were also not changed by feeding fructose; however concentrations of insulin in blood were decreased by, on average, one-half with feeding ruminally protected fructose (FIG. 2) particularly after adaptation during period 2.

EXPERIMENT 2

Experimental design. Two cows in late-lactation, one Brown Swiss and one Holstein, prepared with ruminal cannulae were used to determine the ruminal dry matter disappearance rate of a rumen-protected fructose product (80% fructose), ground corn, and a 50:50 combination of these two feedstuffs. The experimental diet was typical of that fed to lactating dairy cows and is described in Table 1. Cows were milked and fed three times daily.

TABLE 1

Description of diet used for in situ fructose ruminal degradability.

| Item Ingredient | % of DM |
|---|---|
| Alfalfa haylage | 12.5 |
| Corn silage | 24.9 |
| High moisture corn | 18.5 |
| Ground dry corn | 10.2 |
| Corn distillers' grains | 8.72 |
| Whole cottonseed | 8.92 |
| Soybean meal, 44% CP | 8.28 |
| HI Energy 4-191 | 3.39 |
| Pork meat and bone meal | 0.911 |
| Fish meal | 0.892 |
| Calcium carbonate | 0.775 |
| Sodium bicarbonate | 0.640 |
| Salt, sodium chloride | 0.446 |
| DY micro premix2 | 0.232 |
| XP-yeast3 | 0.213 |
| Magnesium oxide | 0.193 |
| Zinpro 4-plex4 | 0.058 |
| Vitamin E202 | 0.038 |

In situ bags (10×20 cm, ANKOM Technology, Fairport, N.Y.) with pore sizes of 50 (+/−15) microns were maintained in the ventral sac of the rumen in a single nylon bag submerged with weight. The in situ bags were inserted into the rumen at time intervals inversely related to the desired sampling frequency, allowing removal of all bags at a common time. Pre-weighed in situ bags contained 1) nothing (blank), 2) 5 g RPF, 3) 5 g ground corn, and 4) 2.5 g of RPF in combination with 2.5 g ground corn on a DM basis. The resultant sample size to bag surface area ratios were 0, 12.5, 12.5, and 12.5 for the blank, RPF, ground corn, and RPF-ground corn combination, respectively. Incubation times include 0 hours, at feeding, and 4, 8, 12, 24, 36, and 48 hours post-feeding in such a fashion that all bags were removed simultaneously.

Upon removal, in situ bags remained in the nylon garment bag while rinsing with 39° C. water until the water remained clear for three consecutive rinses. Any remaining residue on the individual in situ bags was rinsed using water at a similar temperature. In situ bags were allowed to drain prior to being dried at 55° C. for 48 hours. Upon removal from the oven, bags and contents were allowed to air-equilibrate over night prior to being weighed. Lastly, bags and contents were dried at 105° C. for 24 hours, air-equilibrated, and weighed again. These two DM values were multiplied to determine the amount of DM remaining in each in situ bag at each period (minus the amount of DM remaining in the blank) for RPF, ground corn, and the combination of RPF and ground corn.

Figure 3:
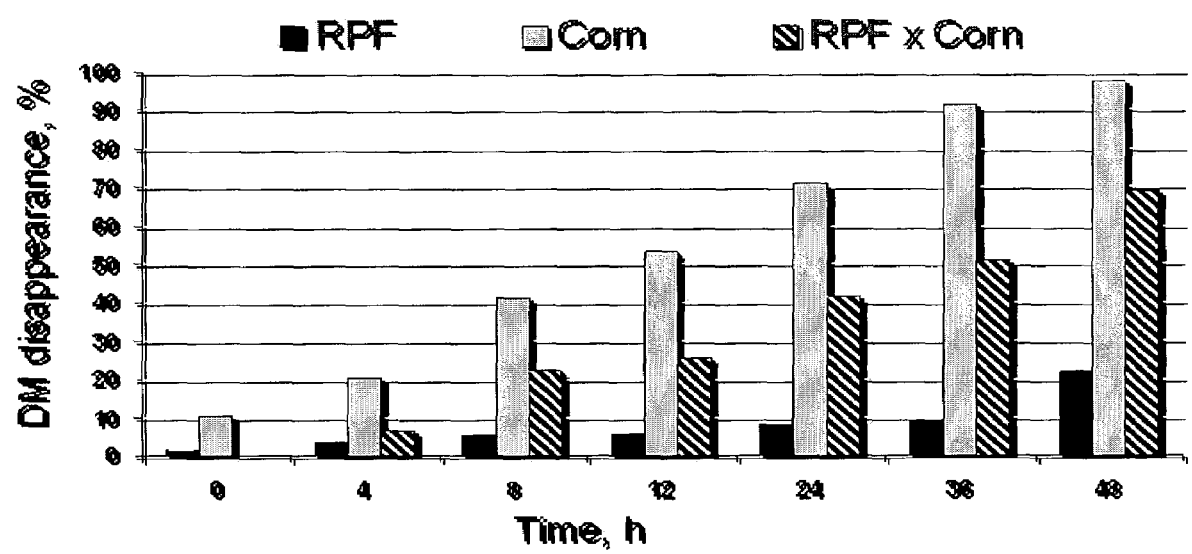
FIG. 3 is a graph showing in situ disappearance of corn, ruminally protected fructose (RPF), and RPF plus corn from Dacron bags.

Results. After 24 hours of digestion in the rumen, 7.8% of the weight of the ruminally protected fructose had disappeared from the dacron bags. After 48 hours, 21.8% of the ruminally protected fructose had disappeared. See FIG. 3. Thus, the enrobement technology used in all the experiments reported here provided at least 78% protection from ruminal degradation, depending upon rate of passage.

EXPERIMENT 3

Experimental design. Dietary treatments containing either ruminally protected fructose or corn starch were assigned randomly to 10 multiparous pregnant, nonlactating dairy cows before parturition. Starting 24 hours postpartum, treated cows were fed 1 kg/day of ruminally protected fructose, 80% fructose by weight, blended in a 0.5 kg of a liquid fat/molasses based supplement as a topdress upon their daily ration. Control cows received 1 kg/day of corn starch blended into 0.5 kg of the same liquid fat/molasses-based supplement containing. Treatments were continued for 7 days postpartum.

On days 5, 6, 7, 12, 13, and 14 of lactation blood samples were collected by tail venupuncture into 10 ml Vacutainer tubes (Beckton Dickenson) containing Na-EDTA. Samples were immediately placed upon ice until extraction of plasma by centrifugation and division into three aliquots which were frozen at −200 until determination of concentrations of glucose, β-hydroxybutyric acid (BHBA) and nonesterified fatty acids (NEFA).

Feed intakes were monitored daily for 7 days postpartum and milk production was monitored daily for 14 days postpartum. Milk composition was determined on milk collected from two milkings on days 7 and 14. Health observations included daily monitoring of body temperature and urine ketones for 7 days postpartum.

TABLE 2

Description of basal diet used for fructose post-fresh feeding experiment. Ruminally protected fructose was fed at 1.0 kg/d (80% fructose) in a molasses-based carrier as a topdress to this basal diet for treated cows. Control cows were fed molasses-based carrier containing corn starch at 0.8 kg/d.

| Item | % of DM | Nutrient | Concentration |
|---|---|---|---|
| Alfalfa hay | 29.2 | Dry matter, % DM | 61.8 |
| Corn silage | 23.3 | Crude protein, % DM | 18.2 |
| High moisture corn | 15.4 | Net Energy for lactatation, | 1.73 |
| Corn grain, ground | 5.6 | Mcal/kg | |
| Soybean meal, 44% CP | 3.0 | Fat, % DM | 5.9 |
| Distillers grain | 8.9 | Neutral detergent fiber, | 29.8 |
| Pork meat and bone | 1.5 | % DM | |
| Whole cottonseed | 6.0 | Acid detergent fiber, % DM | 19.7 |
| Molasses carrier1 | 3.8 | Nonfiber carbohydrate, % DM | 37.3 |
| Fish meal | 0.75 | Calcium, % DM | 0.95 |
| Urea | 0.07 | Phosphorus, % DM | 0.48 |
| Vitamins/Minerals | 2.48 | | |

Figure 4:
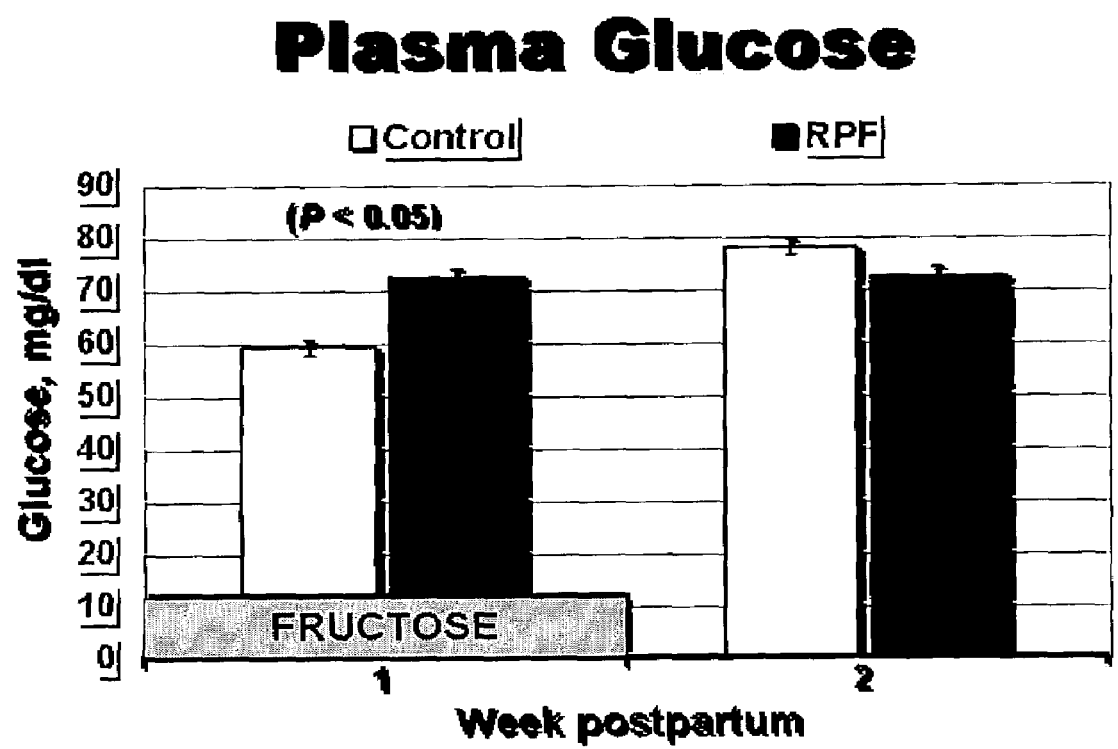
FIG. 4 is a graph showing concentrations of glucose in plasma of early lactation Holstein and Brown Swiss cows fed ruminally protected fructose (RPF) or corn starch (control) at 1 kg/d for 1 wk after calving.

Results. Dry matter intakes were numerically greater for cows fed fructose (18.1 vs. 14.0 kg/day for fructose vs control, respectively, P>0.05). Milk production was not affected by treatment and averaged 32.2 and 33.2 kg/day for fructose and control cows, respectively. Milk composition was not changed except MUN concentrations increased for cows fed fructose (14.6 vs. 11.6 mg/dl, P<0.05). Likewise, daily production of MUN was increased by fructose (5.89 vs. 4.04 g/day, P<0.05). Milk protein production was also increased by fructose (1.48 vs. 1.22 kg/day, P<0.05) Concentrations of glucose in blood were increased by fructose (70.7 vs. 58.6 mg/dl, P=0.10, FIG. 4).

Figure 5:
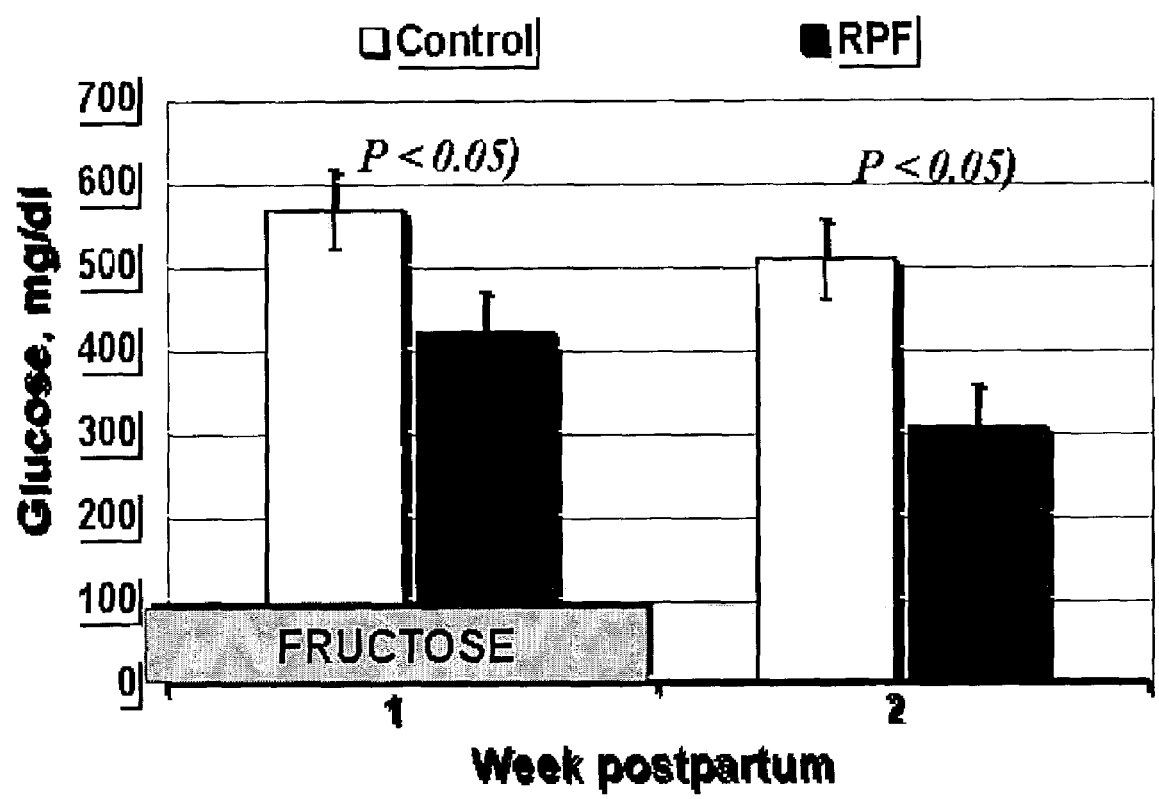
FIG. 5 is a graph showing concentrations of nonesterified fatty acids (NEFA) in plasma of early lactation Holstein and Brown Swiss cows fed ruminally protected fructose (RPF) or corn starch (control) at 1 kg/d for 1 wk after calving.

Concentrations of BHBA were not affected by diet (6.20 vs. 4.74 mg/dl for fructose and control, respectively (P>0.10); however, ruminally protected fructose did decrease concentrations of NEFA in plasma both during both week 1 (P<0.05) and during week 2 (P<0.05) even after fructose feeding was discontinued (FIG. 5). In summary, replacing 0.8 kg/day of starch with ruminally protected fructose improved the carbohydrate status of the early lactation dairy cow and may serve as a preventative for lactation ketosis.

EXPERIMENT 4

Experimental design. Four lactating dairy cows were used in a switch back design to determine the blood glucose response to feeding a ruminally protected fructose supplement. A switchback design allowed determination of the efficacy of this product in a short-term pilot study. The cows were all initially fed a standard lactating cow ration for 2 weeks. After 2 weeks, the daily ration was top-dressed with a supplement containing approximately 2.5 kg of ruminally protected fructose. The protection process is similar to a product currently approved for lactating dairy cows called Reashure manufactured by the Balchem Co. Supplementation with the ruminally protected fructose continued for 2 weeks. The total experimental period was 4 weeks. Jugular blood was sampled prior to the cows being placed on the treatment ration and at the end of the 2 week period during which they were fed the ruminally protected fructose. Cows were catheterized the evening before sampling. Jugular blood (7 ml) was sampled for glucose concentration prior to feeding and every 10 minutes for the first hour and every 20 minutes the next hour. One blood sample was taken prior to providing any feed to the cows.

Figure 6:
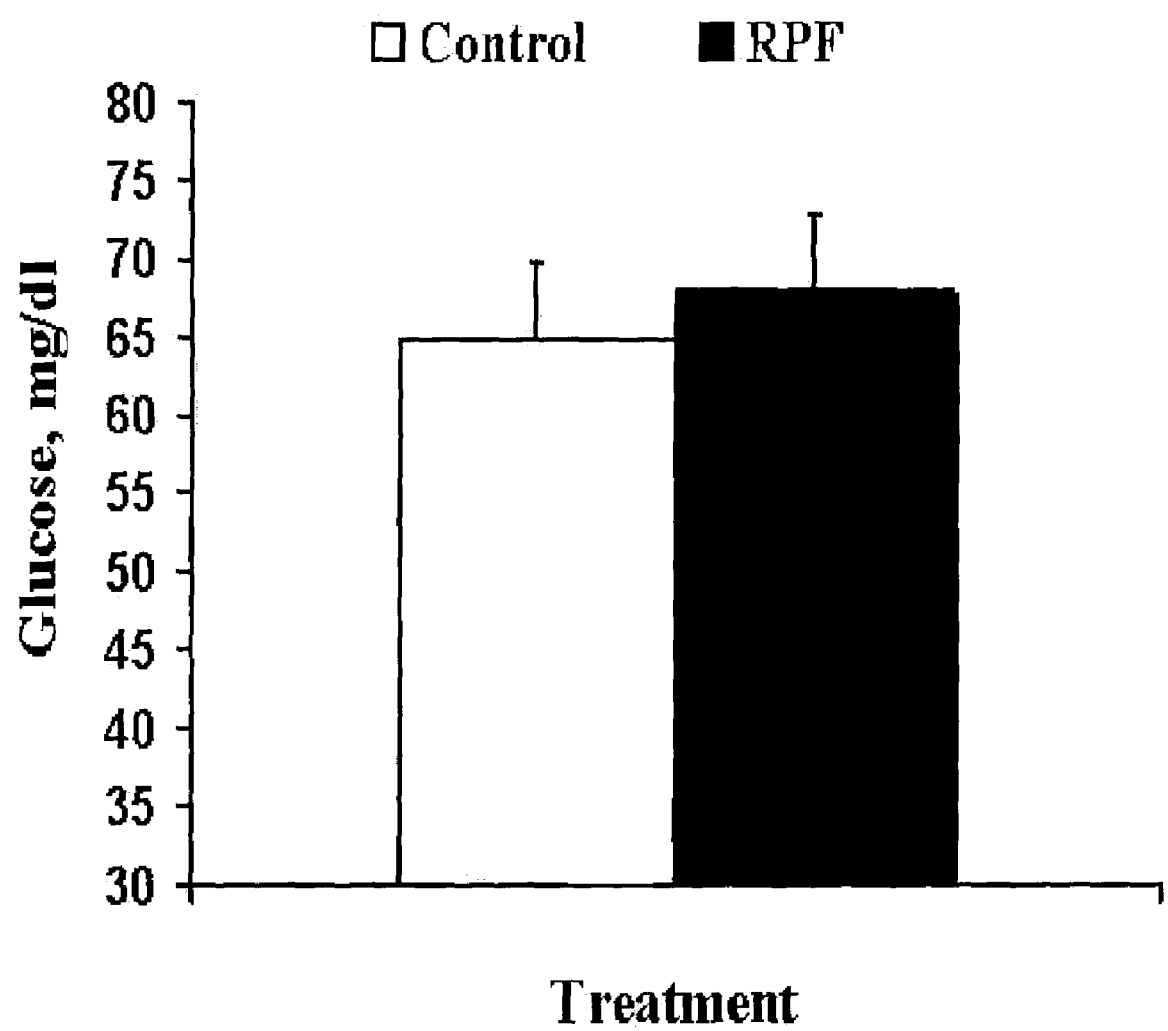
FIG. 6 is a graph showing concentrations of glucose in plasma of lactating dairy cows fed 2.5 kg/d of ruminally protected fructose (RPF) or not (control) for 2 wk.

Results. Concentrations of glucose was increased in plasma of cows fed ruminally protected fructose compared with glucose concentrations in plasma of the same cows fed a control diet (FIG. 6; 68.0 vs. 64.9 mg/dl for ruminally protected fructose vs control, respectively).

With respect to the above description then, it is to be realized that the optimum proportional relationships for the parts of the invention, to include variations in size, materials, shape, and form, are deemed readily apparent and obvious to one skilled in the art, and all equivalent relationships to those illustrated and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of treating energy deficient ruminant animals, the steps of the method comprising:
   providing a carbohydrate, the carbohydrate including fructose;
   coupling the carbohydrate to a rumen protective carrier to form a ruminally protected carbohydrate such that the carbohydrate is protected from degradation in a rumen of a ruminant animal; and
   feeding the ruminally protected carbohydrate to the ruminant animal.

2. The method of claim 1, the steps of the method further comprising:
   feeding the ruminally protected carbohydrate in an amount between 5 grams and 10 kilograms of carbohydrate per day.

3. The method of claim 2 wherein the amount of carbohydrate is about 1 kilogram per day.

4. The method of claim 1, the steps of the method further comprising:
   mixing the ruminally protected carbohydrate in a complete feed; and
   feeding the complete feed to the ruminant animal.

5. The method of claim 1, the steps of the method further comprising:
   mixing the ruminally protected carbohydrate in a grain portion of a complete feed; and
   feeding the complete feed to the ruminant animal.

6. The method of claim 1, the steps of the method further comprising:
   mixing the ruminally protected carbohydrate in a supplement component of an animal feed; and
   feeding the animal feed to the ruminant animal.

7. The method of claim 6 wherein the supplement component is a supplement chosen from a group of supplements consisting of a vitamin supplement, a mineral supplement, a protein supplement, and a liquid supplement.

8. The method of claim 1, the steps of the method further comprising:
   top dressing the ruminally protected carbohydrate on a complete ration of grain feed; and
   feeding the grain feed to the ruminant animal.

9. A feed for alleviating energy deficiency in a ruminant animal, the feed comprising:
   a basal feed ration;
   a ruminally protected carbohydrate including fructose mixed with said basal feed ration.

10. The feed of claim 9 wherein said basal feed ration comprises: a mixture of alfalfa hay, corn silage, high moisture corn, ground corn grain, soybean meal, distillers grain, pork meat and bone, whole cottonseed, molasses, fish meal, urea, vitamins, and minerals.

11. The feed of claim 9 wherein the ruminally protected carbohydrate is fructose enrobed in vegetable fat saturated to a predetermined melting point at rumen pH.

12. The feed of claim 11 wherein said ruminally protected carbohydrate is controlled for particle size and density to greater than 1.0 gm/ml to promote exiting of the ruminally protected carbohydrate from through a bottom opening in the rumen.

13. The feed of claim 9 wherein said carbohydrate is non insulin stimulating.

14. The method of claim 1 wherein said step of feeding said ruminally protected carbohydrate to the animal further comprises:
   feeding said ruminally protected fructose at a rate of between 5 g and 10 kg per day for a period of three weeks before and after the animal has given birth.

15. The method of claim 14 wherein said rate of feeding is about 1.0 kg per day.

16. A method of treating energy deficient ruminant animals, the steps of the method comprising:
   providing a fructose with a ruminally-protective carrier configured to minimize degradation of the fructose in a rumen of the ruminant animal; and feeding the ruminally protected fructose to the ruminant animal.

17. The method of claim 16 wherein the fructose is of a type that provides fructose-2,6-biphosphate when metabolized in the consuming ruminant animal.

18. The method of claim 16 wherein the fructose with the ruminally-protective carrier provides a monosaccharide postruminally in the ruminant animal fed the ruminally protected fructose.

19. The method of claim 16 wherein the rumen inert carrier is configured to protect the fructose from fermentation in the rumen of the consuming ruminant animal.

20. The method of claim 16 wherein the ruminally-protective carrier encapsulates the fructose.

21. The method of claim 16 wherein the fructose is of a type that does not depend upon insulin for uptake by tissues of the consuming animal.

22. The method of claim 16 wherein the fructose is of a type that does not decrease glucose concentrations in blood of the consuming ruminant animal.

23. The method of claim 16 wherein the fructose is of a type that increases hepatic lipogenesis in the consuming ruminant animal.

24. The method of claim 16 wherein the fructose is of a type that does not cause glucogon levels to decline in the consuming ruminant animal.

* * * * *